United States Patent [19]

Manigault

[11] 3,888,687

[45] June 10, 1975

[54] ALUMINA-CHROME REFRACTORY

[75] Inventor: Edward L. Manigault, Cincinnati, Ohio

[73] Assignee: The Chas. Taylor's Sons Co., Cincinnati, Ohio

[22] Filed: Mar. 4, 1974

[21] Appl. No.: 448,008

Related U.S. Application Data

[63] Continuation-in-part of Ser. No. 402,090, Oct. 1, 1973.

[52] U.S. Cl. ................................. 106/66; 106/67
[51] Int. Cl. ..................... C04b 35/10; C04b 35/12
[58] Field of Search ........................ 106/65, 66, 67

[56] References Cited
UNITED STATES PATENTS

| | | | |
|---|---|---|---|
| 3,377,178 | 4/1968 | Miller et al. | 106/66 |
| 3,378,385 | 4/1968 | McCreight et al. | 106/65 |
| 3,640,739 | 2/1972 | Bakker | 106/67 |

*Primary Examiner*—J. Poer

[57] ABSTRACT

An improved alumina-chrome refractory composition has been prepared comprising the following ingredients:

| | |
|---|---|
| Tabular Alumina | 59–98% |
| Calcined Alumina | 0–10% |
| Chromic Oxide | 1–25% |
| Phosphate Compound | 1–18% |
| Bentonite | 0–4% |
| Water | 0–12% |

This refractory composition is superior to the prior art composition which contained no phosphate compound.

8 Claims, No Drawings

ALUMINA-CHROME REFRACTORY

This application is a continuation-in-part of my application Ser. No. 402,090, filed Oct. 1, 1973.

BACKGROUND OF THE INVENTION

An alumina-chrome refractory brick composition has been prepared by the prior art which contains the following composition:

| | |
|---|---|
| Tabular Alumina | 65–99% |
| Calcined Alumina | 0–10% |
| Chromic Oxide | 1–25% |

Such a product has been useful as refractory brick composition for use in the ferrous and non-ferrous industries.

It is desirable to produce refractory brick compositions of this type which possess superior properties such as increased bulk density, increased modulus of rupture and reduced porosity without adversely affecting the advantageous properties of the prior art brick composition of this type specified above.

It is also desirable to produce superior types of ramming and plastic mixes.

SUMMARY OF THE INVENTION

It has been discovered that the composition of the prior art refractory brick comprised of alumina and chromic oxide may be improved considerably by adding from 1 to 18% of a phosphate compound to said composition.

The fired refractory composition produced by the instant invention comprises the following:

| | |
|---|---|
| Tabular Alumina | 59–98% |
| Calcined Alumina | 0–10% |
| Chromic Oxide | 1–25% |
| Phosphate Compound | 1–18% |

The refractory composition is prepared by adding a phosphate compound in amounts from 1–18% to the following alumina-chromic oxide mixture:

| | |
|---|---|
| Tabular Alumina | 59–98% |
| Calcined Alumina | 0–10% |
| Chromic Oxide | 1–25% |

A variety of phosphate compounds may be employed. Among those which are particularly effective are phosphoric acid, mono-aluminum phosphate, mono-ammonium phosphate and aluminum dihydrogen orthophosphate. The phosphate compound or mixture of phosphate compounds is added in amounts from 1 to 18% by weight of the other ingredients. During the firing of this composition, a portion of the phosphate content may be lost by vaporization.

This composition is either fired to produce fired refractory products, or the mixture is used either as a ramming mixture, or as a plastic mixture.

When it is desired to produce a plastic mixture, small amounts of bentonite (1–4%) and water (1–12%), if needed, are added to the mixture. The presence of the bentonite increases the plasticity in the mixture. The plastic mixture contains the following ingredients:

| | |
|---|---|
| Tabular Alumina | 59–97% |
| Calcined Alumina | 0–10% |
| Chromic Oxide | 1–25% |
| Phosphate Compound | 1–18% |
| Bentonite | 1–4% |
| Water | 0–12% |

The presence of the bentonite in the mixture is not necessary when the mixture is used as a ramming mix, or when fired to produce the refractory composition described above.

DESCRIPTION OF THE PREFERRED EMBODIMENTS

In preparing the refractory composition of the instant invention, it is important to have present in the mixture a variety of sizes of the various ingredients employed. Tabular alumina may be used as the only source of alumina, but it is preferred to have a mixture of tabular and calcined alumina.

The tabular alumina should be employed in various sizes. All of the —one-fourth inch +325 mesh alumina should be employed in the tabular form and in addition, with respect to the —325 mesh alumina, from one-fourth to all of the —325 mesh alumina should be present in the tabular form. If calcined alumina is used, it should be —325 mesh in size. 65 to 94% of the alumina should be —one-fourth inch to +325 mesh in size, while the remainder of the alumina should be ground to —325 mesh. The chromic oxide should be —325 mesh in size. The bentonite when used also should be —325 mesh.

In preparing the refractory shaped products of the instant invention, the alumina, chromic oxide and the phosphate compound are mixed together and formed into the desired shapes which are then fired at temperatures from 500° to 1650°C for 2 to 8 hours. After firing, the refractory products of the instant invention possesses increased bulk density, and increased modulus of rupture with reduced porosity, as compared to aluminum-chromic oxide brick composition containing no phosphate compounds.

It has also been discovered that this same mixture of alumina, chromic oxide and the phosphate compound is useful as a ramming mix. In addition a plastic mix is also prepared from the same mixture except that it is desirable also to add 1–4% bentonite and water, if necessary.

In order to describe the instant invention more fully, the following examples are presented:

EXAMPLE 1

The following ingredients were added to form a refractory mixture:

| | | |
|---|---|---|
| Tabular Alumina | −4+60 mesh, Kg. | 51.4 |
| Tabular Alumina | −60+325 mesh, Kg. | 14.8 |
| Tabular Alumina | −325 mesh, Kg. | 19.1 |
| Calcined Alumina | −325 mesh, Kg. | 4.7 |
| Chromic Oxide | −325 mesh, Kg. | 10.0 |
| 80% Phosphoric Acid, Kg. | | 5.0 |

The mixture was then formed into bricks 9 in. × 4½ in. × 3 in. and the bricks were then fired at 1560°C for 5 hours. After cooling to room temperature, the bricks were analyzed to determine their properties which are listed as follows:

| | |
|---|---|
| Modulus of Rupture | 7013 |
| Porosity, % | 10.2 |
| Absorption, % | 3.0 |
| Bulk Density, gm./cc | 3.37 |

EXAMPLE 2

The procedure of Example 1 was repeated except that 4.7 Kg. of mono-aluminum phosphate were added instead of the phosphoric acid employed in Example 1. Bricks having properties similar to those obtained in Example 1 were produced.

The operational details and the results obtained are recorded in the following table along with those of Example 1.

TABLE

| MATERIALS | EXAMPLES 1 | 2 | CONTROL RUN |
|---|---|---|---|
| Tabular Alumina −4+60 mesh, Kg. | 51.4 | 51.4 | 51.4 |
| Tabular Alumina −60+325 mesh, Kg. | 14.8 | 14.8 | 14.8 |
| Tabular Alumina −325 mesh, Kg. | 19.1 | 19.1 | 19.1 |
| Calcined Alumina −325 mesh, Kg. | 4.7 | 4.7 | 4.7 |
| Chromic Oxide −325 mesh, Kg. | 10.0 | 10.0 | 10.0 |
| Lignin Liquor | 0 | 0 | 2.0 |
| Water | 0 | 0 | 1.9 |
| 80% phosphoric Acid | 5.0 | 0 | 0 |
| Mono-Aluminum Phosphate | 0 | 4.7 | 0 |
| PROPERTIES | | | |
| Modulus of Rupture, psi | 7013 | 7347 | 5515 |
| Porosity, % | 10.2 | 10.9 | 14.2 |
| Absorption, % | 3.0 | 3.2 | 4.3 |
| Bulk Density, gm./cc. | 3.37 | 3.39 | 3.29 |

For comparative purposes a control run using no phosphate compound was carried out and the results of this control run are also recorded in the table.

The mixtures described in Examples 1 and 2 may also be used as ramming mixes.

EXAMPLE 3

Another mixture was prepared which contained the following ingredients:

| | | |
|---|---|---|
| Tabular Alumina | −4+60 mesh, Kg. | 51.4 |
| Tabular Alumina | −60+325 mesh, Kg. | 14.8 |
| Tabular Alumina | −325 mesh, Kg. | 19.1 |
| Calcined Alumina | −325 mesh, Kg. | 4.7 |
| Mono-aluminum phosphate | −325 mesh, Kg. | 14 |
| Bentonite | −325 mesh, Kg. | 2 |
| Chrome Oxide | −325 mesh, Kg. | 10 |

This mixture was used as a plastic mix in the collar of an induction furnace in which malleable iron was melted. It was found that this mixture was virtually unaffected after 4 days, while the prior art material, that is 90% alumina plastic, had to be replaced.

The mixture was also used on the door sill and surrounding area of an indirect arc furnace used for melting grey iron. This mixture lasted at least four times as long as the prior art alumina plastic.

From the above description and by the examples presented, refractory products containing alumina and chromic oxide have been prepared which possess superior modulus of rupture, lower porosities, and higher bulk densities when phosphate compounds are employed in the mixtures.

In addition, the refractory mixtures before firing form superior ramming and plastic mixes.

While this invention has been described and illustrated by the examples shown, it is not intended to be strictly limited thereto and other variations and modifications may be employed within the scope of the following claims:

I claim:

1. A ceramic composition, useful as a ramming mix, comprising 59 to 98% tabular alumina, 0 to 10% calcined alumina, 1 to 25% chromic oxide and 1 to 18% of a phosphate compound.

2. Composition according to claim 1 in which the phosphate compound is selected from the group consisting of phosphoric acid, mono-aluminum phosphate, mono-ammonium phosphate and aluminum dihydrogen orthophosphate.

3. A ceramic composition useful as a plastic mix comprising 59 to 97% tabular alumina, 0 to 10% calcined alumina, 1 to 25% chromic oxide, 1 to 4% bentonite, 0 to 12% water and 1 to 18% of a phosphate compound.

4. A fired refractory product comprising 59 to 98% tabular alumina, 0 to 10% calcined alumina, 1 to 25% chromic oxide and 1 to 18% of a phosphate compound.

5. A method for preparing a fired refractory composition which comprises admixing 59 to 98% tabular alumina, 0 to 10% calcined alumina, 1 to 25% chromic oxide, 4 to 18% of a phosphate compound, and firing the mixture at temperatures from 500° to 1650°C for 2 to 8 hours to form said refractory composition.

6. Method according to claim 5 in which the tabular alumina should be present in size from −one-fourth in. through −325 mesh, 65 to 94% of the alumina present should be −one-fourth mesh +325 mesh, the remainder being −325 mesh.

7. Method according to claim 5 in which from one-fourth to all of the −325 mesh alumina is present as tabular alumina, the remainder being calcined alumina.

8. Method according to claim 5 in which the phosphate compound is selected from the group consisting of phosphoric acid, mono-aluminum phosphate, mono-ammonium phosphate and aluminum dihydrogen orthophosphate.

* * * * *